(12) United States Patent
Iwamoto et al.

(10) Patent No.: US 11,932,261 B2
(45) Date of Patent: Mar. 19, 2024

(54) DELIVERY SYSTEM, DELIVERY METHOD, AND PROGRAM

(71) Applicant: Toyota Jidosha Kabushiki Kaisha, Toyota (JP)

(72) Inventors: Kunihiro Iwamoto, Nagakute (JP); Hirotaka Komura, Anjo (JP); Yuta Itozawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 17/412,646

(22) Filed: Aug. 26, 2021

(65) Prior Publication Data
US 2022/0063637 A1 Mar. 3, 2022

(30) Foreign Application Priority Data

Aug. 28, 2020 (JP) .................. 2020-144185

(51) Int. Cl.
*B60W 60/00* (2020.01)
*B25J 9/16* (2006.01)
*B60P 3/00* (2006.01)
*B60P 3/07* (2006.01)
*B60W 40/13* (2012.01)
*B60W 50/00* (2006.01)

(52) U.S. Cl.
CPC ............ *B60W 40/13* (2013.01); *B25J 9/1605* (2013.01); *B60P 3/007* (2013.01); *B60P 3/07* (2013.01); *B60W 50/0097* (2013.01); *B60W 60/00256* (2020.02); *B60W 2040/1315* (2013.01); *B60W 2520/105* (2013.01); *B60W 2520/125* (2013.01); *B60W 2710/18* (2013.01)

(58) Field of Classification Search
CPC .. B25J 9/1605; B60P 3/06; B60W 2040/1315; B60W 2520/105; B60W 2520/125; B60W 2710/18; B60W 40/13; B60W 50/0097; B60W 60/00256; G05D 2201/0216
See application file for complete search history.

(56) References Cited

U.S. PATENT DOCUMENTS 9,457,970 B1 * 10/2016 Zevenbergen ......... B25J 9/0093
10,279,480 B1 * 5/2019 Holson .................... G01C 9/00
(Continued)

FOREIGN PATENT DOCUMENTS

CN 107848720 A 3/2018
CN 208134180 U 11/2018
(Continued)

*Primary Examiner* — Jeff A Burke
*Assistant Examiner* — Zachary Joseph Wallace
(74) *Attorney, Agent, or Firm* — Dinsmore & Shohl LLP

(57) ABSTRACT

A delivery system includes an autonomously-moving-type delivery vehicle configured to deliver an article to a delivery destination thereof, and a transportation vehicle configured to carry and transport the delivery vehicle. A control unit configured to control an operation of the delivery vehicle acquires information about an acceleration of the transportation vehicle from the transportation vehicle, and controls the operation of the delivery vehicle based on the information about the acceleration so that a displacement that is predicted to occur in the delivery vehicle due to the acceleration of the transportation vehicle is reduced.

14 Claims, 6 Drawing Sheets

(56) References Cited

U.S. PATENT DOCUMENTS

| | | | |
|---|---|---|---|
| 2008/0208391 A1* | 8/2008 | Hasegawa | B62D 57/032 |
| | | | 700/254 |
| 2016/0068357 A1* | 3/2016 | Bastian, II | B65G 67/20 |
| | | | 414/751.1 |
| 2017/0106738 A1* | 4/2017 | Gillett | B62K 25/02 |
| 2018/0165782 A1 | 6/2018 | Ibe | |
| 2018/0354143 A1* | 12/2018 | Dorfman | H04L 63/029 |
| 2019/0220000 A1* | 7/2019 | Ibe | G06Q 10/04 |
| 2020/0207250 A1* | 7/2020 | Jarvis | G06Q 50/28 |
| 2020/0249698 A1* | 8/2020 | Lu | G05D 1/0088 |
| 2020/0262068 A1* | 8/2020 | Rodriguez | B25J 9/1641 |
| 2021/0138654 A1* | 5/2021 | Lee | B25J 5/007 |
| 2021/0387808 A1* | 12/2021 | Kalouche | G06Q 10/083 |

FOREIGN PATENT DOCUMENTS

| | | |
|---|---|---|
| CN | 208855501 U | 5/2019 |
| JP | S62-048475 A | 3/1987 |
| JP | 2017-145074 A | 8/2017 |
| JP | 2017-145075 A | 8/2017 |
| JP | 2019-069853 A | 5/2019 |

* cited by examiner

DELIVERY SYSTEM, DELIVERY METHOD, AND PROGRAM

CROSS REFERENCE TO RELATED APPLICATIONS

This application is based upon and claims the benefit of priority from Japanese patent application No. 2020-144185, filed on Aug. 28, 2020, the disclosure of which is incorporated herein in its entirety by reference.

BACKGROUND

The present disclosure relates to a delivery system, a delivery method, and a program.

Japanese Unexamined Patent Application Publication No. 2019-69853 discloses a delivery system in which a transportation vehicle that carries therein a delivery vehicle for delivering an article(s) travels to the vicinity of the destination of the article(s) to be delivered (hereinafter also referred to as "delivery destination" of the article(s)), and then the delivery vehicle gets out of the transportation vehicle and delivers the article to the delivery destination.

SUMMARY

The inventors have found the following problem in the delivery system disclosed in Japanese Unexamined Patent Application Publication No. 2019-69853.

In the delivery system disclosed in Japanese Unexamined Patent Application Publication No. 2019-69853, when the transportation vehicle suddenly accelerates or decelerates (when the acceleration of the transportation vehicle increases), a force is exerted on the delivery vehicle carried in the transportation vehicle, so that an unintended displacement (an unintended movement) may occur in the delivery vehicle. Therefore, for example, there is a possibility that the delivery vehicle moves and collides against the inner wall of the transportation vehicle, causing problems such as a failure of the delivery vehicle and damage to an article(s) to be delivered by the delivery vehicle.

Further, in the case where a manipulator (a robot arm) for conveying articles, instead of the delivery vehicle (or in addition to the delivery vehicle), is provided in the transportation vehicle, similar problems may also occur. That is, when the transportation vehicle suddenly accelerates or decelerates, a force is exerted on the manipulator provided in the transportation vehicle, so that an unintended displacement may occur in the manipulator. Therefore, for example, there is a possibility that the manipulator may move so as to collide against the inner wall of the transportation vehicle, causing problems such as a failure of the manipulator and damage to an article which is being conveyed by the manipulator.

The present disclosure has been made in view of the above-described circumstances, and an object thereof is to provide a delivery system capable of preventing problems which would otherwise occur in a delivery vehicle carried in a transportation vehicle or a manipulator provided in the transportation vehicle due to a sudden acceleration or deceleration of the transportation vehicle.

A first exemplary aspect is a delivery system including:
an autonomously-moving-type delivery vehicle configured to deliver an article to a delivery destination thereof; and
a transportation vehicle configured to carry and transport the delivery vehicle, in which:
the delivery system makes a computer perform processes including:
acquiring information about an acceleration of the transportation vehicle from the transportation vehicle; and
predicting a displacement occurring in the delivery vehicle due to the acceleration of the transportation vehicle based on the information about the acceleration, and controlling an operation of the delivery vehicle so that the displacement is reduced.

Further, another exemplary aspect is a delivery method, in which
an autonomously-moving-type delivery vehicle is carried in and delivered by a transportation vehicle, the delivery vehicle being configured to deliver an article, and
the delivery method includes:
acquiring information about an acceleration of the transportation vehicle from the transportation vehicle; and
predicting a displacement occurring in the delivery vehicle due to the acceleration of the transportation vehicle based on the information about the acceleration, and controlling an operation of the delivery vehicle so that the displacement is reduced.

Further, another exemplary aspect is a program for putting an autonomously-moving-type delivery vehicle into a transportation vehicle and transport the delivery vehicle by the transportation vehicle, the delivery vehicle being configured to deliver an article, in which
the program being adapted to cause a computer to perform processes including:
acquiring information about an acceleration of the transportation vehicle from the transportation vehicle; and
predicting a displacement occurring in the delivery vehicle due to the acceleration of the transportation vehicle based on the information about the acceleration, and controlling an operation of the delivery vehicle so that the displacement is reduced.

As described above, according to an aspect of the present disclosure: information about the acceleration of the transportation vehicle is acquired from the transportation vehicle; a displacement occurring in the delivery vehicle due to the acceleration of the transportation vehicle is predicted based on the information about the acceleration; and the operation of the delivery vehicle is controlled so that the displacement is reduced. Therefore, it is possible to prevent problems which would otherwise occur in the delivery vehicle carried in the transportation vehicle due to a sudden acceleration or deceleration of the transportation vehicle.

A center of gravity of the delivery vehicle may be lowered when the operation of the delivery vehicle is controlled so as to reduce the displacement. By the above-described configuration, it is possible to effectively prevent problems such as a problem that the delivery vehicle tumbles down due to a sudden acceleration or deceleration of the transportation vehicle.

A wheel of the delivery vehicle may be braked when the operation of the delivery vehicle is controlled so as to reduce the displacement. By the above-described configuration, it is possible to reduce the displacement that occurs in the delivery vehicle due to the acceleration of the transportation vehicle.

A wheel of the delivery vehicle may be driven so as to cancel the displacement when the operation of the delivery vehicle is controlled so as to reduce the displacement. By the above-described configuration, it is possible to reduce the displacement occurring in the delivery vehicle due to an acceleration of the transportation vehicle more effectively.

A manipulator may be provided in at least one of the transportation vehicle and the delivery vehicle. Further, a displacement occurring in the manipulator due to the acceleration of the transportation vehicle may be predicted based on the information about the acceleration, and an operation of the manipulator may be controlled so that the displacement is reduced. By the above-described configuration, it is possible to prevent problems which would otherwise occur in the manipulator due to a sudden acceleration or deceleration of the transportation vehicle.

Another exemplary aspect is a delivery system including:
a transportation vehicle configured to transport an article to be delivered; and
a manipulator configured to convey the article inside the transportation vehicle, in which
the delivery system makes a computer perform processes including:
acquiring information about an acceleration of the transportation vehicle from the transportation vehicle; and
predicting a displacement occurring in the manipulator due to the acceleration of the transportation vehicle based on the information about the acceleration, and controlling an operation of the manipulator so that the displacement is reduced.

Further, another exemplary aspect is a delivery method, in which
a manipulator is provided in at least one of a transportation vehicle and a delivery vehicle, and
a displacement occurring in the manipulator due to an acceleration of the transportation vehicle is predicted based on information about the acceleration, and an operation of the manipulator is controlled so that the displacement is reduced.

Further, another exemplary aspect is a program for conveying an article to be delivered inside a transportation vehicle by using a manipulator, the transportation vehicle being configured to transport the article, in which
the program being adapted to cause a computer to perform processes including:
acquiring information about an acceleration of the transportation vehicle from the transportation vehicle; and
predicting a displacement occurring in the manipulator due to the acceleration of the transportation vehicle based on the information about the acceleration, and controlling an operation of the manipulator so that the displacement is reduced.

As described above, according to an aspect of the present disclosure: information about the acceleration of the transportation vehicle is acquired from the transportation vehicle; a displacement occurring in the manipulator due to the acceleration of the transportation vehicle is predicted based on the information about the acceleration; and the operation of the manipulator is controlled so that the displacement is reduced. Therefore, it is possible to prevent problems which would otherwise occur in the manipulator provided in the transportation vehicle due to a sudden acceleration or deceleration of the transportation vehicle.

The manipulator may include: a base part; a link base part rotatably connected to the base part; and a foldable link mechanism rotatably connected to the link base part. Further, when the operation of the manipulator is controlled so as to reduce the displacement, the link mechanism may be folded so that moment acting on a rotation shaft of the link base part is reduced. By the above-described configuration, it is possible to reduce the displacement occurring in the manipulator due to the acceleration of the transportation vehicle more effectively.

According to the present disclosure, it is possible to provide a delivery system capable of preventing problems which would otherwise occur in a delivery vehicle carried in a transportation vehicle or a manipulator provided in the transportation vehicle due to a sudden acceleration or deceleration of the transportation vehicle.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
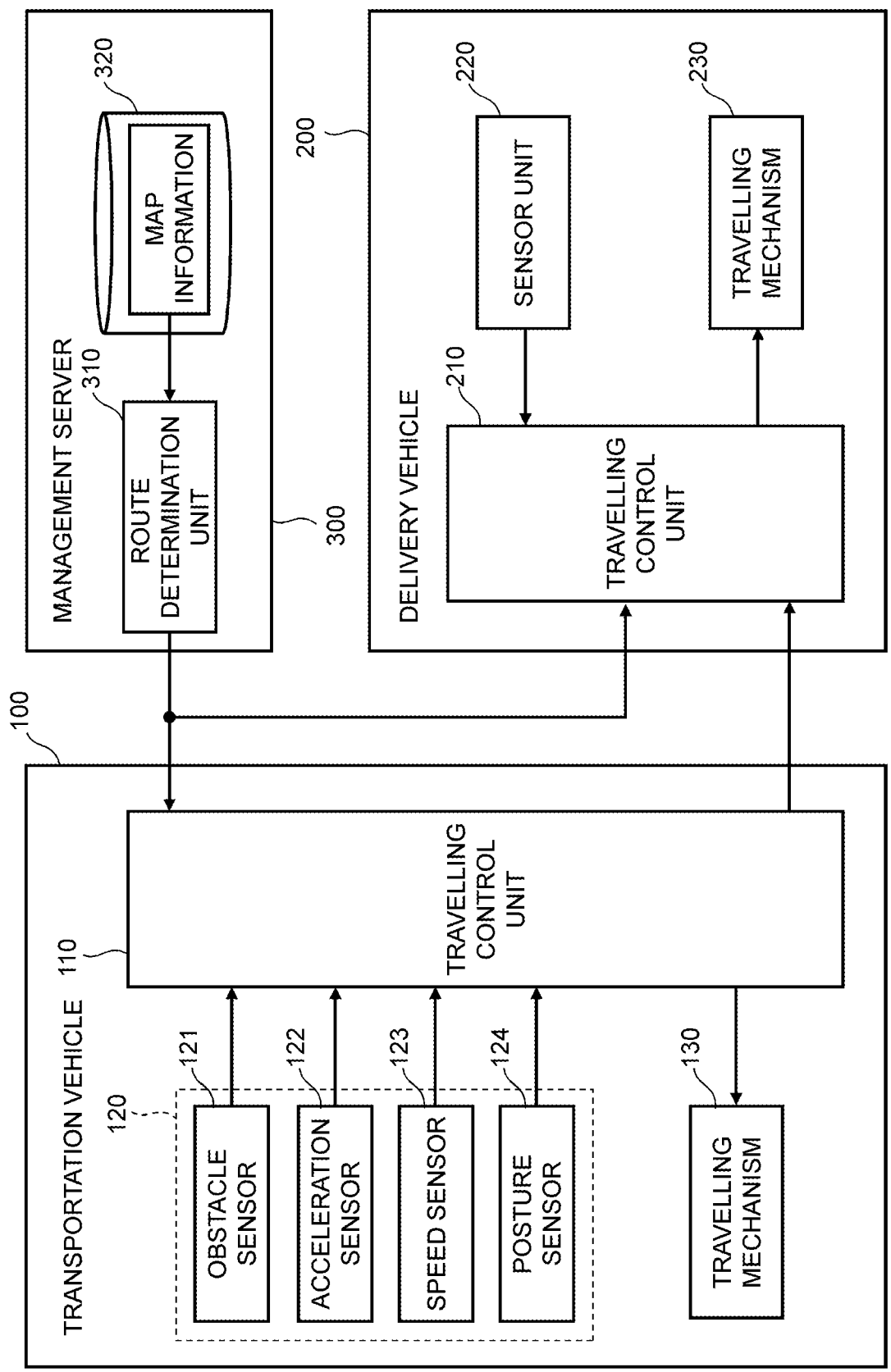
FIG. 1 is a block diagram of a delivery system according to a first embodiment.

Specific embodiments will be described hereinafter in detail with reference to the drawings. The same or corresponding elements are denoted by the same reference numerals (or symbols) throughout the drawings, and redundant descriptions thereof are omitted as required for clarifying the explanation.

First Embodiment

<Configuration of Delivery System>

Firstly, a delivery system and a delivery method according to a first embodiment will be described with reference to FIG. 1. FIG. 1 is a block diagram of a delivery system according to the first embodiment. As shown in FIG. 1, the delivery system according to this embodiment includes a transportation vehicle 100, a delivery vehicle 200, and a management server 300.

In the delivery system according to this embodiment, after the transportation vehicle 100 carrying the delivery vehicle 200 travels toward the delivery destination of an article(s), the delivery vehicle 200 gets out of the transportation vehicle 100 and delivers the article(s) to the delivery destination. Then, in the delivery system according to this embodiment: information about the acceleration of the transportation vehicle 100 is acquired from the transportation vehicle 100; a displacement that occurs in the delivery vehicle 200 due to the acceleration of the transportation vehicle 100 is predicted based on the information about the acceleration; and the operation of the delivery vehicle 200 is controlled so that the displacement is reduced. The above-described series of processes are performed by a computer.

Firstly, the transportation vehicle 100 will be described.
The transportation vehicle 100 carries and transports the delivery vehicle 200. Although the transportation vehicle 100 in this embodiment is an autonomous mobile vehicle (i.e., an autonomously-driven vehicle), the transportation vehicle 100 may be a vehicle driven by a human driver. As shown in FIG. 1, the transportation vehicle 100 includes a traveling control unit 110, a sensor unit 120, and a traveling mechanism 130. Further, the transportation vehicle 100 is wirelessly connected to the delivery vehicle 200 and the management server 300 so as to be able to communicable with them.

Note that when the management server 300 is disposed in the transportation vehicle 100, the transportation vehicle 100 may be connected to the management server 300 through a cable(s). Further, although the transportation vehicle 100 includes only one delivery vehicle 200 in the example shown in FIG. 1, the transportation vehicle 100 may include a plurality of delivery vehicles 200.

The traveling control unit 110 controls the traveling mechanism 130 based on various types of information acquired from the sensor unit 120. In this way, the transportation vehicle 100 autonomously travels.

Further, in the delivery system according to the embodiment, the traveling control unit 110 transmits the information about the acceleration of the transportation vehicle 100 to a traveling control unit 210 of the delivery vehicle 200.

The traveling control unit 110 includes, for example, an arithmetic unit such as a CPU (Central Processing Unit), and a storage unit such as a RAM (Random Access Memory) and a ROM (Read Only Memory) in which various types of control programs, data, and the like are stored. That is, the traveling control unit 110 has a function as a computer, and controls the traveling mechanism 130 based on the aforementioned various types of control programs and the like.

In the example shown in FIG. 1, the sensor unit 120 includes an obstacle sensor 121, an acceleration sensor 122, a speed sensor 123, and a posture sensor 124.

The obstacle sensor 121 detects an obstacle ahead of the transportation vehicle 100 in the traveling direction thereof. Further, the obstacle sensor 121 detects an obstacle at the time when the delivery vehicle 200 gets out of the transportation vehicle 100. The obstacle sensor 121 is, for example, a radar sensor, a sonar sensor, an ultrasonic sensor, a lidar sensor, a camera, or the like. Examples of the obstacle include people such as pedestrians and animals as well as other vehicles and objects on the road that have accidentally fallen from other vehicles.

The acceleration sensor 122 detects the acceleration of the transportation vehicle 100. It is possible to detect vibrations of the transportation vehicle 100 caused by irregularities or the like on the road surface by detecting the acceleration of the transportation vehicle 100.

The speed sensor 123 detects the speed of the transportation vehicle 100.

The posture sensor 124 detects the posture of the transportation vehicle 100. It is possible to detect the gradient of the road on which the transportation vehicle 100 is traveling (hereinafter also referred to as the road gradient) by the posture sensor 124.

The traveling mechanism 130 is a mechanism for moving the transportation vehicle 100 (i.e., making the transportation vehicle 100 travel). For example, the traveling mechanism 130 includes, in addition to the driving mechanism, such as a motor or an engine, for moving the transportation vehicle 100, a braking mechanism for stopping the transportation vehicle 100, and a steering mechanism for making the transportation vehicle 100 turn (i.e., making the transportation vehicle 100 change the traveling direction).

Next, the delivery vehicle 200 will be described.

The delivery vehicle 200 is an autonomous mobile vehicle which, after being transported by the transportation vehicle 100, gets out of the transportation vehicle 100 and delivers an article(s) to the delivery destination thereof. As shown in FIG. 1, the delivery vehicle 200 includes a traveling control unit 210, a sensor unit 220, and a traveling mechanism 230. Further, the delivery vehicle 200 is wirelessly connected to the transportation vehicle 100 and the management server 300 so as to be able to communicable with them. Note that when the management server 300 is disposed in the delivery vehicle 200, the delivery vehicle 200 may be connected to the management server 300 through a cable(s).

The traveling control unit 210 controls the traveling mechanism 230 based on various types of information acquired from the sensor unit 220. That is, the delivery vehicle 200 autonomously travels as the traveling control unit 210 controls the traveling mechanism 230. Note that, similarly to the sensor unit 120 of the transportation vehicle 100, the sensor unit 220 includes various types of sensors.

Further, in the delivery system according to the embodiment, the traveling control unit 210 acquires information about the acceleration of the transportation vehicle 100 from the traveling control unit 110 of the transportation vehicle 100. Then, a displacement occurring in the delivery vehicle 200 due to the acceleration of the transportation vehicle 100 is predicted based on this information, and the traveling mechanism 230 is controlled so that the displacement is reduced. That is, the operation of the delivery vehicle 200 is controlled. A specific example of the operation of the delivery vehicle 200 will be described later.

Therefore, in regard to the delivery vehicle 200 carried in the transportation vehicle 100, it is possible to prevent problems which would otherwise occur due to a sudden acceleration or deceleration of the transportation vehicle 100.

The information about the acceleration of the transportation vehicle 100 is, for example, information represented by a control signal that the traveling control unit 110 provides to the traveling mechanism 130 in order to instruct the traveling mechanism 130 to accelerate or decelerate the transportation vehicle 100. Alternatively, the information may be the acceleration of the transportation vehicle 100 that is detected by the acceleration sensor 122 and acquired by the traveling control unit 110. By acquiring the control signal for indicating an acceleration or a deceleration, it is possible to control the operation of the delivery vehicle 200 at a timing earlier than the timing at which the acceleration of the transportation vehicle 100 detected by the acceleration sensor 122 is acquired. Therefore, it is possible to prevent problems that would otherwise occur due to a sudden acceleration or deceleration of the transportation vehicle 100 more effectively.

Similarly to the traveling control unit 110 of the transportation vehicle 100, the traveling control unit 210 includes an arithmetic unit such as a CPU, and a storage unit such as a RAM and a ROM in which various types of control programs, data, and the like are stored. That is, the traveling control unit 210 has a function as a computer, and controls the traveling mechanism 230 based on the aforementioned various types of control programs and the like.

The traveling mechanism 230 is a mechanism for moving the delivery vehicle 200 (i.e., making the delivery vehicle 200 travel). For example, the traveling mechanism 230 includes, in addition to the driving mechanism, such as a motor or an engine, for moving the delivery vehicle 200, a braking mechanism for stopping the delivery vehicle 200, and a steering mechanism for making the delivery vehicle 200 turn (i.e., making the delivery vehicle 200 change the traveling direction).

Next, the management server 300 will be described.

The management server 300 is a server for managing the delivery system, and is, for example, a cloud server. As shown in FIG. 1, the management server 300 includes a route determination unit 310 and a storage unit 320.

As shown in FIG. 1, the route determination unit 310 determines a delivery route from the place where the transportation vehicle 100 is currently present to a delivery destination based on map information stored in the storage unit 320. Then, the route determination unit 310 transmits the determined delivery route to the traveling control unit 110 of the transportation vehicle 100 and the traveling control unit 210 of the delivery vehicle 200. Note that the map information may include road-surface information.

As described above, the traveling control unit 210 acquires information about the acceleration of the transportation vehicle 100 from the traveling control unit 110 of the transportation vehicle 100. Then, the traveling control unit 210 predicts a displacement that occurs in the delivery vehicle 200 due to the acceleration of the transportation vehicle 100 based on this information, and controls the operation of the delivery vehicle 200 so that the displacement is reduced.

Therefore, in the delivery vehicle 200 carried in the transportation vehicle 100, it is possible to prevent problems that would otherwise occur due to a sudden acceleration or deceleration of the transportation vehicle 100.

<Method for Controlling Operation of Delivery Vehicle 200>

Figure 2:
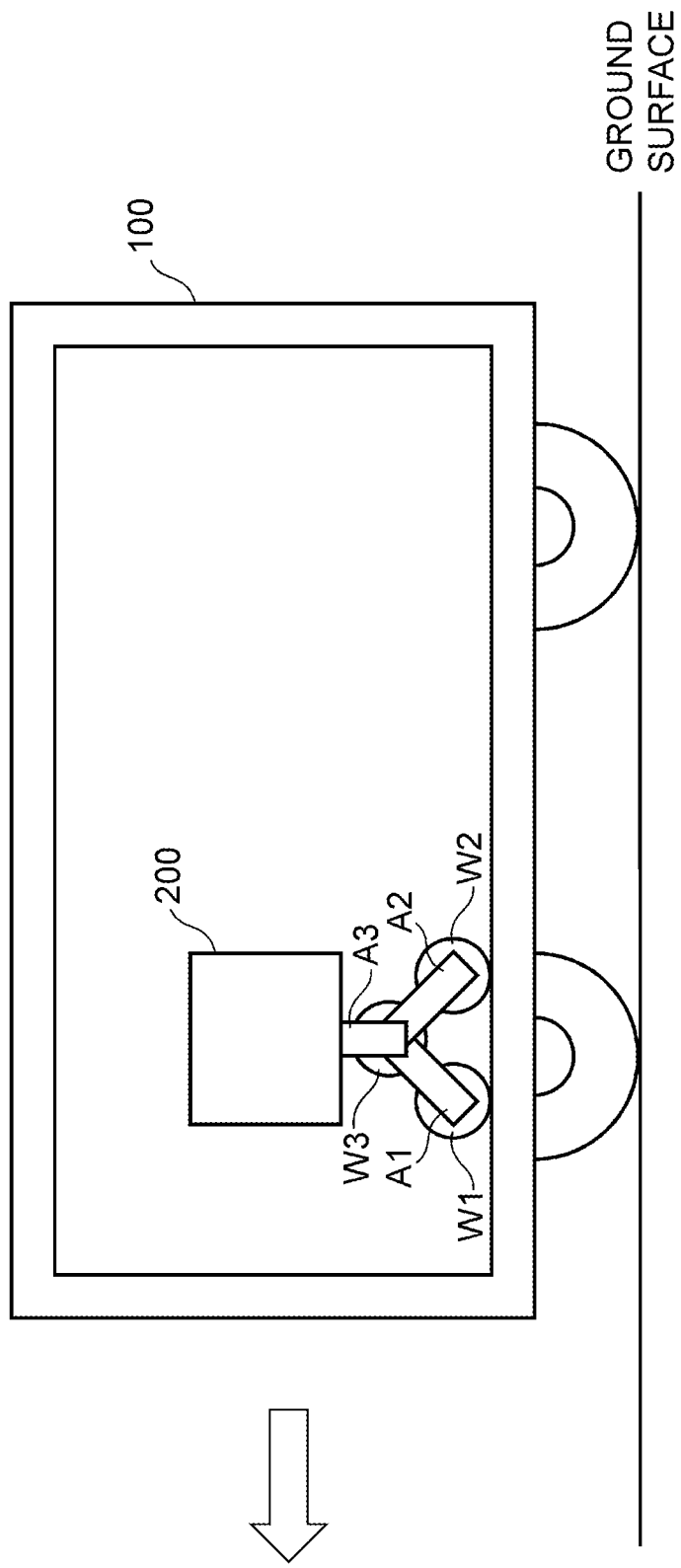
FIG. 2 is a side view showing a delivery vehicle 200 inside a transportation vehicle 100.
Figure 3:
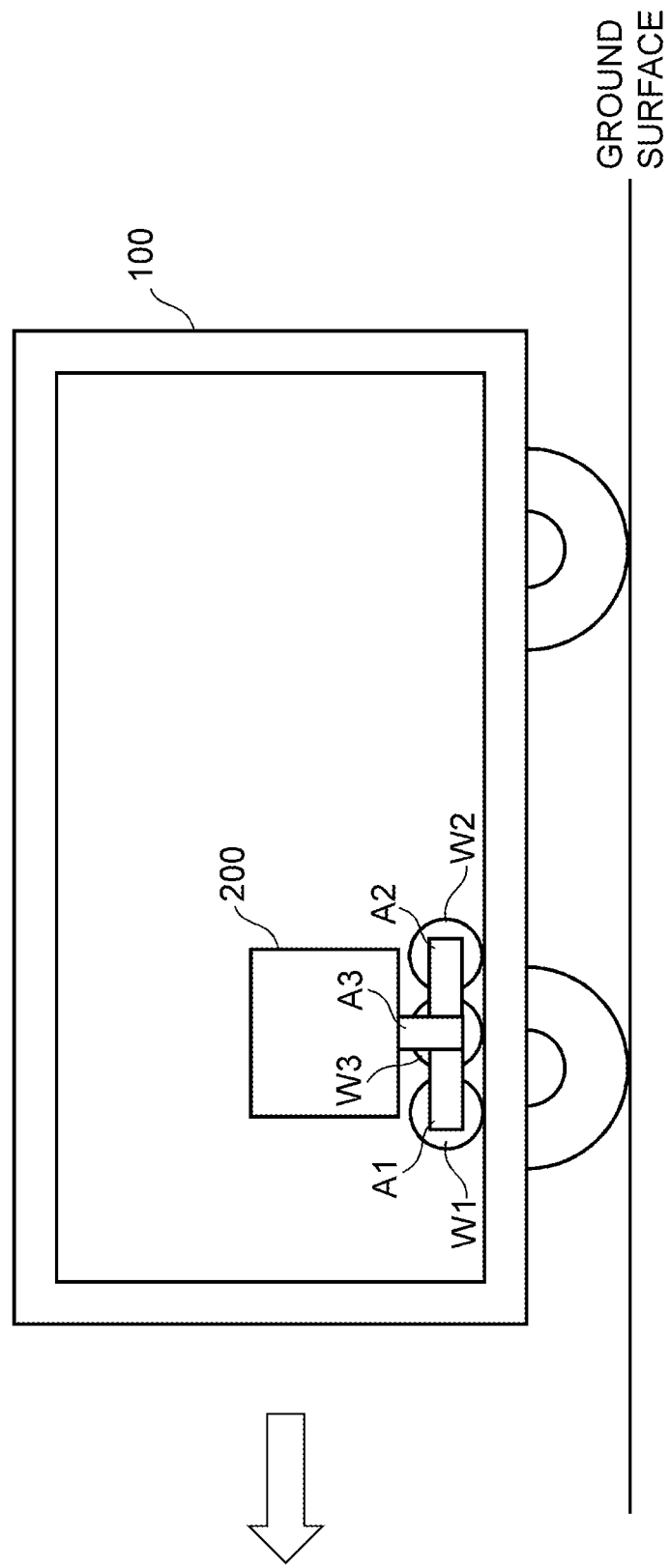
FIG. 3 is a side view showing the delivery vehicle 200 inside the delivery vehicle 100.

Next, a method for controlling the operation of the delivery vehicle 200 that is performed when the transportation vehicle 100 has suddenly accelerated or decelerated will be described in detail with reference to FIGS. 2 and 3 as well as reference to FIG. 1. FIGS. 2 and 3 are side views showing a delivery vehicle 200 inside a transportation vehicle 100.

As shown in FIGS. 2 and 3, the delivery vehicle 200 according to this embodiment includes pairs of wheels W1, W2 and W3, connecting arms A1 and A2, and a fixed arm A3. The pairs of wheels W1, W2 and W3, the connecting arms A1 and A2, and the fixed arm A3 constitute a part of the traveling mechanism 230 shown in FIG. 1.

Note that although the delivery vehicle 200 shown in FIGS. 2 and 3 is a six-wheel vehicle including six wheels W1, W2 and W3, it may be a four-wheel vehicle. That is, there is no particular restriction on the type of the delivery vehicle 200.

The wheels W1 are rotatably connected to one end of the connecting arm A1. The other end of the connecting arm A1 is rotatably connected to the lower end of the fixed arm A3.

The wheels W2 are rotatably connected to one end of the connecting arm A2. The other end of the connecting arm A2 is rotatably connected to the lower end of the fixed arm A3.

The upper end of the fixed arm A3 is fixed to the main body of the delivery vehicle 200. The wheels W3 are rotatably connected to the lower end of the fixed arm A3.

As shown in FIG. 2, the delivery vehicle 200 can travel by using the four wheels, i.e., the pairs of wheels W1 and W2. However, as shown in FIG. 3, the delivery vehicle 200 can also travel by using the six wheels, i.e., pairs of wheels W1, W2 and W3. By rotating the connecting arms A1 and A2 around the connecting part between the connecting arms A1 and A2 and the fixed arm A3, the posture of the delivery vehicle 200 can be switched between the posture shown in FIG. 2 and that shown in FIG. 3.

In the posture of the transportation vehicle 100 shown in FIG. 2 in which only the four wheels W1 and W2 are in contact with the floor surface of the transportation vehicle 100, the area on the floor surface occupied by the delivery vehicle 200 can be reduced compared to the area that is occupied when the delivery vehicle 200 is in the posture in which the six wheels W1, W2 and W3 are in contact with the floor surface. However, since the center of gravity of the delivery vehicle 200 is higher in the posture shown in FIG. 3, the delivery vehicle 200 is more likely to tumble down.

Therefore, when the transportation vehicle 100 has suddenly accelerated or decelerated, the delivery vehicle 200 may take a posture in which the delivery vehicle 200 is less likely to tumble down. For example, the traveling control unit 210 controls the traveling mechanism 230 so that the delivery vehicle 200 takes the posture in which the center of gravity is low as shown in FIG. 3, instead of taking the posture in which the center of gravity is high as shown in FIG. 2. That is, the traveling control unit 210 controls the traveling mechanism 230 so as to lower the center of gravity of the delivery vehicle 200. In this way, it is possible to effectively prevent problems such as a problem that the delivery vehicle 200 tumbles down due to a sudden acceleration or deceleration of the transportation vehicle 100.

Further, in the posture shown in FIG. 3, since the width of the delivery vehicle 200 in the lateral direction is shorter than the length thereof in the longitudinal direction, the delivery vehicle 200 is more likely to tumble down in the lateral direction than tumbling down in the longitudinal direction. Therefore, a steering mechanism(s) (not shown) for the wheels W1, W2 and W3 may be operated so that the longitudinal direction of the delivery vehicle 200 coincides with that of the transportation vehicle 100 when the transportation vehicle 100 has suddenly accelerated or decelerated. As described above, the steering mechanism(s) for the wheels W1, W2, and W3 is included in the traveling mechanism 230.

In this way, it is possible to prevent problems such as a problem that the delivery vehicle 200 tumbles down due to a sudden acceleration or deceleration of the transportation vehicle 100 more effectively.

Further, a braking mechanism(s) (not shown) for the wheels W1, W2 and W3 may be operated when the transportation vehicle 100 has suddenly accelerated or decelerated. As described above, the braking mechanism(s) for the wheels W1, W2 and W3 is included in the traveling mechanism 230.

In this way, it is possible to prevent or reduce the unintended displacement (the unintended movement) of the delivery vehicle 200.

Further, at least one of the pairs of wheels W1, W2, and W3 may be actively driven so as to cancel a displacement of the delivery vehicle 200 that is predicted to occur when the transportation vehicle 100 suddenly accelerates or decelerates. That is, the driving mechanism(s) (not shown) for the wheels W1, W2, and W3 may be operated so that the delivery vehicle 200 moves in the direction opposite to the predicted displacement. As described above, the driving mechanism(s) for the wheels W1, W2, and W3 is included in the traveling mechanism 230.

In this way, it is possible to prevent or reduce the unintended displacement (the unintended movement) of the delivery vehicle 200 even further.

Second Embodiment

Figure 4:
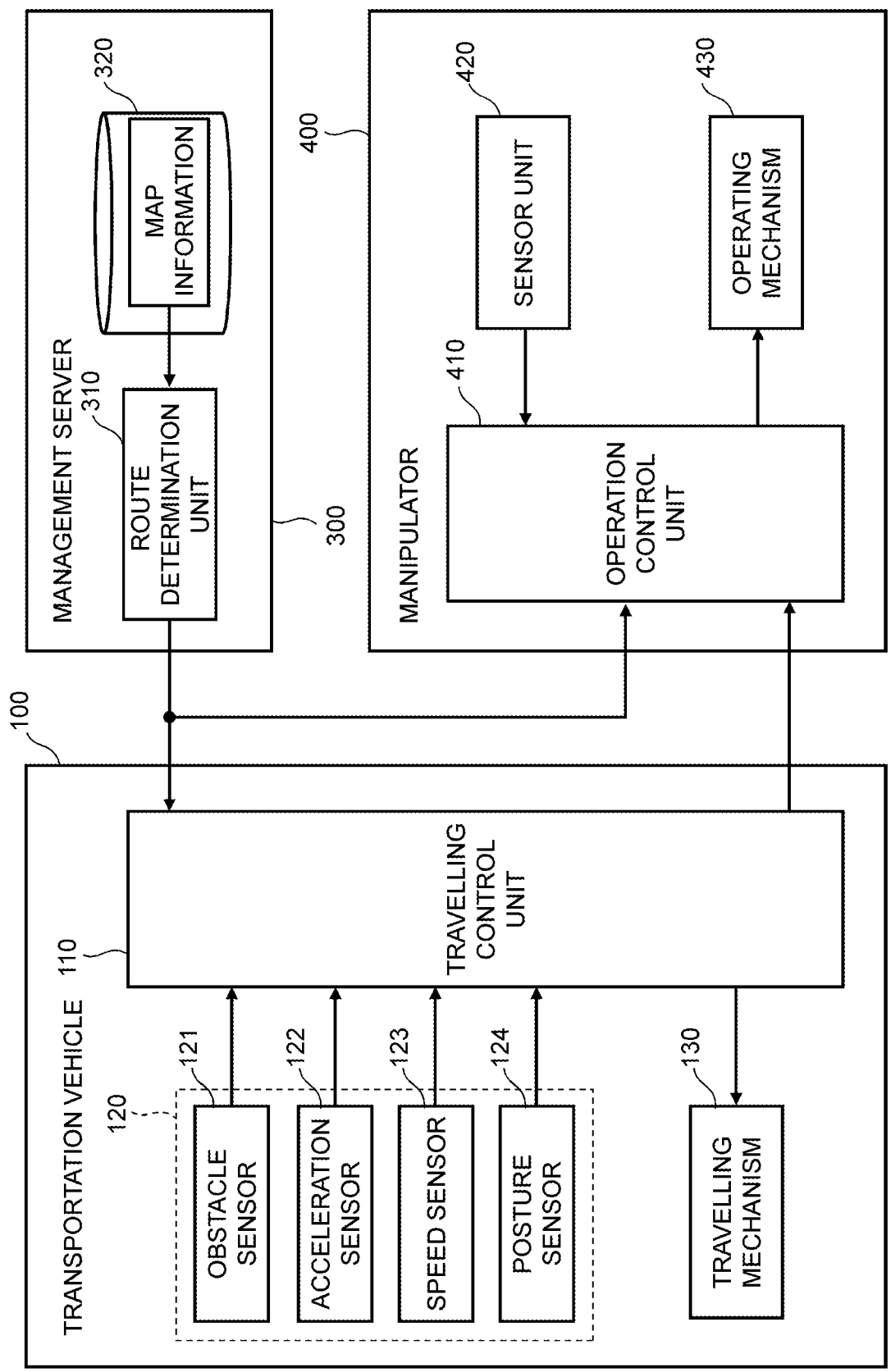
FIG. 4 is a block diagram of a delivery system according to a second embodiment.
Figure 5:
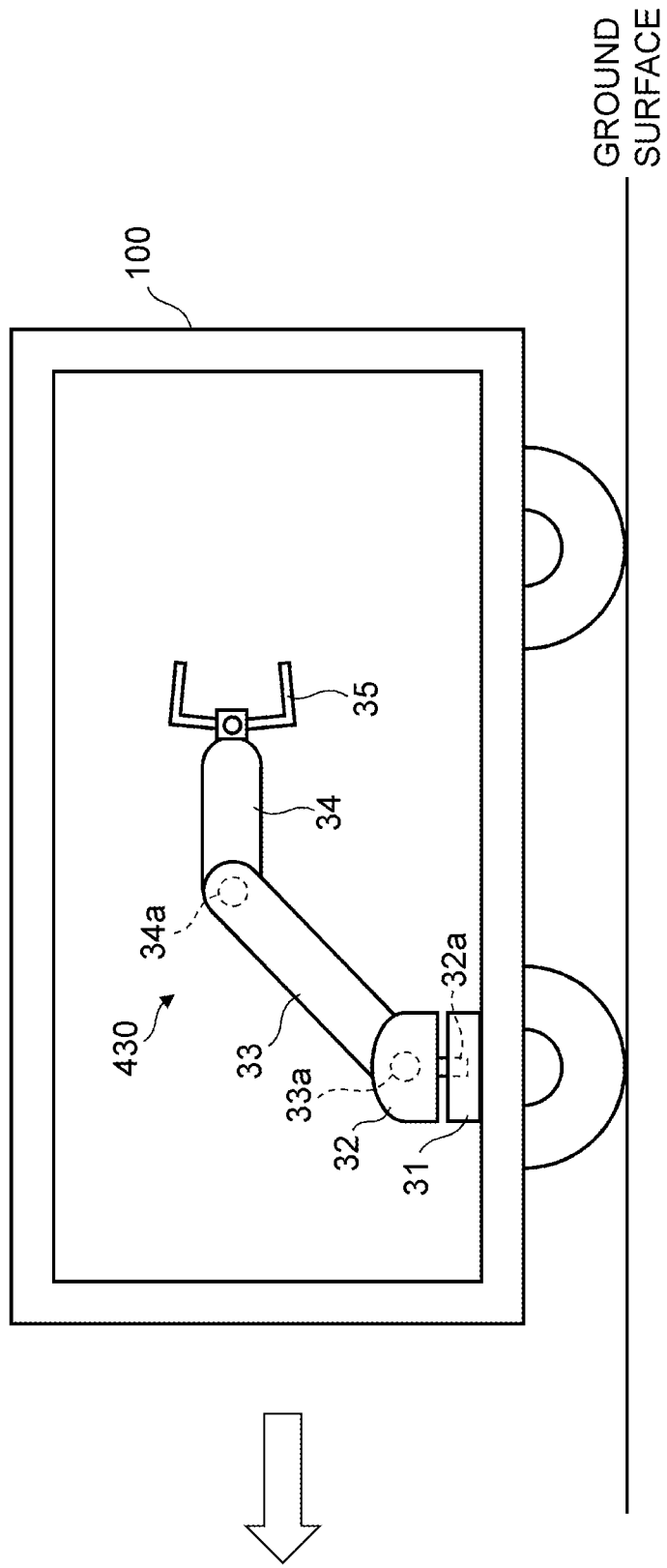
FIG. 5 is a side view showing a manipulator 400 inside a transportation vehicle 100.
Figure 6:
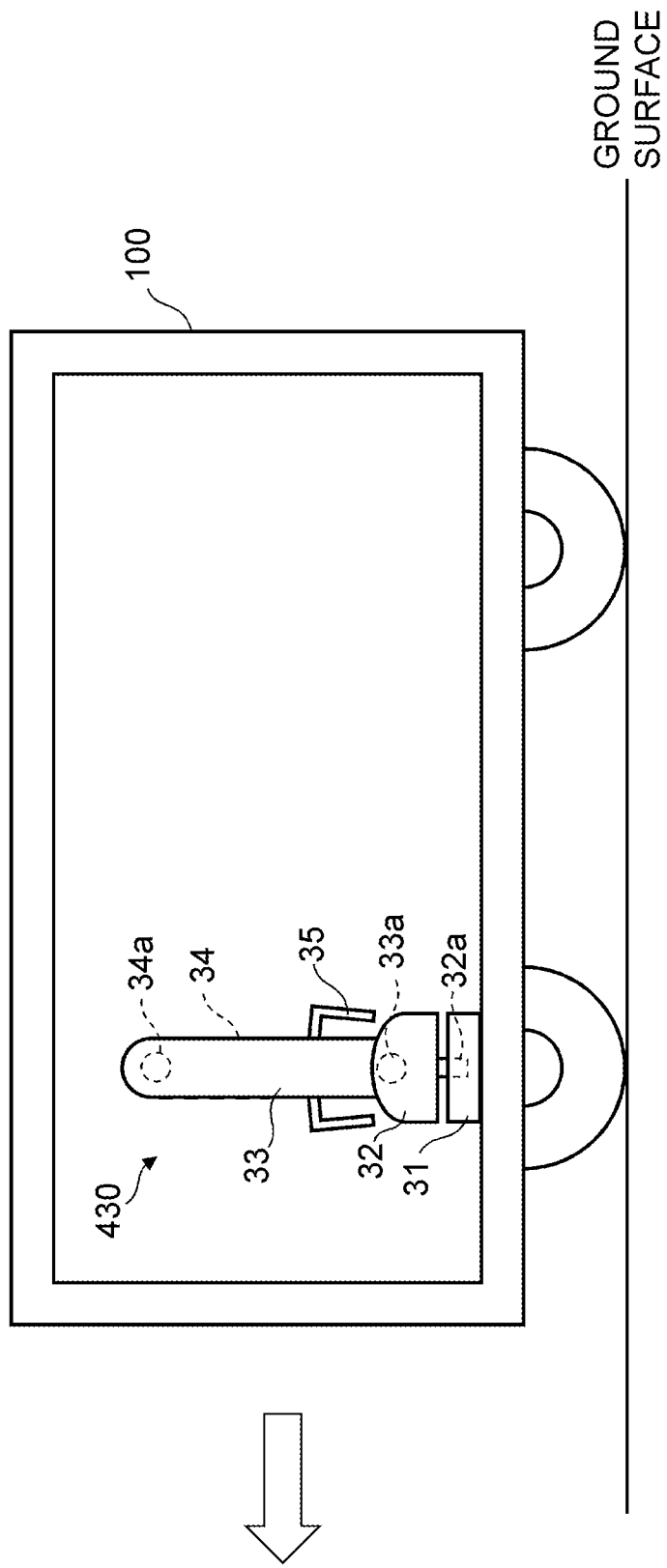
FIG. 6 is a side view showing the manipulator 400 inside the transportation vehicle 100.

Next, a delivery system and a delivery method according to a second embodiment will be described with reference to FIGS. 4 to 6. FIG. 4 is a block diagram of a delivery system according to the second embodiment. FIGS. 5 and 6 are side views showing a manipulator 400 provided inside a transportation vehicle 100. As shown in FIGS. 4 to 6, the delivery system according to the second embodiment includes the manipulator 400 in place of the delivery vehicle 200 in the first embodiment.

The manipulator 400 is disposed inside the transportation vehicle 100 and conveys articles inside the transportation vehicle 100.

As shown in FIG. 1, the manipulator 400 includes an operation control unit 410, a sensor unit 420, and an operating mechanism 430. Further, the manipulator 400 is connected to the transportation vehicle 100 and a management server 300 wirelessly or through a cable(s) so as to be able to communicate with them.

The operation control unit 410 controls the operating mechanism 430 based on various types of information acquired from the sensor unit 420. That is, the manipulator 400 is operated (i.e., manipulated) as the operation control unit 410 controls the operating mechanism 430. Note that, similarly to the sensor unit 120 of the transportation vehicle 100, the sensor unit 420 includes various types of sensors.

Further, in the delivery system according to this embodiment, the operation control unit 410 acquires information about the acceleration of the transportation vehicle 100 from the traveling control unit 110 of the transportation vehicle 100. A displacement that occurs in the manipulator 400 due to the acceleration of the transportation vehicle 100 is predicted based on this information, and the operating mechanism 430 is controlled so that the displacement is reduced. That is, the operation of the manipulator 400 is controlled.

Therefore, in the manipulator 400 provided in the transportation vehicle 100, it is possible to prevent problems that would otherwise occur due to a sudden acceleration or deceleration of the transportation vehicle 100.

In the example shown in FIG. 5, the operating mechanism 430 includes a base part 31, a link base part 32, a first link 33, a second link 34, and an end effector 35. The manipulator 400 grasps an article and conveys the grasped article by using the end effector 35.

Note that there is no restriction on the configuration of the end effector 35 as long as the end effector 35 can convey an article. For example, the manipulator 400 may suck an article and conveys the sucked article by using the end effector 35. Further, although the link mechanism is composed of two links, i.e., the first and second links 33 and 34 in the example shown in FIG. 5, the link mechanism may be composed of three or more links.

The base part 31 is fixed to the floor surface of the transportation vehicle 100.

The link base part 32 is connected to the base part 31 through a rotation shaft 32a in such a manner that the link base part 32 can rotate around the rotation shaft 32a. The rotation shaft 32a of the link base part 32 is a shaft perpendicular to the floor surface of the transportation vehicle 100. The link base part 32 is rotationally driven by a motor or the like (not shown).

The first link 33 is rotationally connected to the link base part 32 through a first joint part 33a provided at the rear end of the first link 33. Further, the second link 34 is rotatably connected to the front end of the first link 33 through a second joint part 34a provided at the rear end of the second link 34. The end effector 35 is connected to the front end of the second link 34.

Note that the rotation axes of the first and second joint parts 33a and 34a are parallel to the floor surface of the transportation vehicle 100. The height of the end effector 35 can be changed by rotating the first and second links 33 and 34. Each of the first and second links 33 and 34 is rotationally driven by a motor or the like (not shown). By the above-described configuration, the manipulator 400 can grasp and convey an article by using the end effector 35.

As shown in FIG. 5, the moment acting on the rotation shaft 32a of the link base part 32 increases in the state in which the first and second links 33 and 34 extend in a direction parallel to the floor surface of the transportation vehicle 100. Therefore, when the transportation vehicle 100 has suddenly accelerated or decelerated, an unintended displacement is likely to occur in the end effector 35.

In contrast, in FIG. 6, the first and second links 33 and 34 are folded so as to overlap each other (e.g., to be aligned with each other), and the first and second links 33 and 34 extend in parallel with the rotation shaft 32a of the link base part 32. Therefore, it is possible to reduce the moment acting on the rotation shaft 32a of the link base part 32 as compared to the moment that occurs in the posture shown in FIG. 5, and thereby to prevent or reduce the unintended displacement (the unintended movement) of the end effector 35.

Further, the braking mechanism(s) (not shown) for the link base part 32, the first link 33, and second link 34 may be operated when the transportation vehicle 100 has suddenly accelerated or decelerated. As described above, the braking mechanism(s) for the link base part 32, the first link 33, and the second link 34 is included in the operating mechanism 430 shown in FIG. 4.

In this way, it is possible to prevent or reduce the unintended displacement (the unintended movement) of the end effector 35, i.e., the manipulator 400.

Further, at least one of the link base part 32, the first link 33, and the second link 34 may be actively driven so that the end effector 35 moves in a direction opposite to the direction of the force exerted on the end effector 35 when the transportation vehicle 100 has suddenly accelerated or decelerated. That is, the driving mechanism(s) (not shown) for the link base part 32, the first link 33, and the second link 34 may be operated. The driving mechanism(s) for the link base part 32, the first link 33, and the second link 34 is included in the operating mechanism 430 shown in FIG. 4.

In this way, it is possible to prevent or reduce the unintended displacement (the unintended movement) of the end effector 35, i.e., the manipulator 400 even further.

As described above, in the delivery system according to this embodiment, the operation control unit 410 acquires information about the acceleration of the transportation vehicle 100 from the traveling control unit 110 of the transportation vehicle 100. Then, a displacement that occurs in the manipulator 400 due to the acceleration of the transportation vehicle 100 is predicted based on this information, and the operation of the manipulator 400 is controlled so that the displacement is reduced. Therefore, in the manipulator 400 provided in the transportation vehicle 100, it is possible to prevent problems which would otherwise occur due to a sudden acceleration or deceleration of the transportation vehicle 100.

The rest of the configuration is similar to that of the first embodiment, and therefore the description thereof is omitted.

Note that this embodiment and the first embodiment may be combined with each other. That is, the delivery system may include the manipulator 400 shown in FIG. 4 in addition to the transportation vehicle 100, the delivery vehicle 200, and the management server 300 shown in FIG. 1. Alternatively, the delivery vehicle 200 may include the manipulator 400.

In the above-described examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery system comprising:
an autonomously-moving-type delivery vehicle configured to deliver an article to a delivery destination thereof, the delivery vehicle comprising three pairs of wheels; and
a transportation vehicle configured to carry and transport the delivery vehicle, wherein:
the transportation vehicle comprises a first processor configured to acquire information about an acceleration of the transportation vehicle, and transmit the information about the acceleration of the transportation vehicle to the delivery vehicle; and
the delivery vehicle comprises a second processor configured to:
receive the information about the acceleration of the transportation vehicle from the transportation vehicle;
predict a displacement occurring in the delivery vehicle due to the acceleration of the transportation vehicle based on the information about the acceleration of the transportation vehicle;
when the predicted displacement is less than a first threshold, cause the delivery vehicle to operate on two pairs of wheels; and
when the predicted displacement is greater than or equal to the first threshold, cause the delivery vehicle to operate on three pairs of wheels.

2. The delivery system according to claim 1, wherein a center of gravity of the delivery vehicle is lowered when the operation of the delivery vehicle is controlled so as to counteract the predicted displacement.

3. The delivery system according to claim 1, wherein a wheel of the delivery vehicle is braked when the operation of the delivery vehicle is controlled so as to counteract the predicted displacement.

4. The delivery system according to claim 1, wherein a wheel of the delivery vehicle is driven so as to cancel the predicted displacement when the operation of the delivery vehicle is controlled so as to counteract the predicted displacement.

5. The delivery system according to claim 1, wherein
a manipulator is provided in at least one of the transportation vehicle and the delivery vehicle, and
a displacement occurring in the manipulator due to the acceleration of the transportation vehicle is predicted based on the information about the acceleration, and an operation of the manipulator is controlled so that the predicted displacement is counteracted.

6. A delivery system comprises:
a transportation vehicle configured to transport an article to be delivered; and
a manipulator configured to convey the article inside the transportation vehicle, the manipulator comprising a base part, a link base part, a first link, a second link, and an end effector, wherein
the delivery system makes a computer perform processes including:
acquiring information about an acceleration of the transportation vehicle from the transportation vehicle; and
predicting a displacement occurring in the manipulator due to the acceleration of the transportation vehicle based on the information about the acceleration;
when the predicted displacement is less than a first threshold, causing the first link and the second link to extend in a direction parallel to a floor surface of the transportation vehicle; and
when the predicted displacement is greater than or equal to the first threshold, causing the first link and the second link to be folded to align with each other and extend in a direction parallel with a rotation shaft of the link base part.

7. A delivery method, wherein
an autonomously-moving-type delivery vehicle is carried in and delivered by a transportation vehicle, the delivery vehicle comprising three pairs of wheels and being configured to deliver an article, and
the delivery method makes a computer perform processes including:
acquiring information about an acceleration of the transportation vehicle from the transportation vehicle;
predicting a displacement occurring in the delivery vehicle due to the acceleration of the transportation vehicle based on the information about the acceleration;
when the predicted displacement is less than a first threshold, causing the delivery vehicle to operate on two pairs of wheels; and
when the predicted displacement is greater than or equal to the first threshold, causing the delivery vehicle to operate on three pairs of wheels.

8. The delivery method according to claim 7, wherein a center of gravity of the delivery vehicle is lowered when the operation of the delivery vehicle is controlled so as to counteract the predicted displacement.

9. The delivery method according to claim 7, wherein a wheel of the delivery vehicle is braked when the operation of the delivery vehicle is controlled so as to counteract the predicted displacement.

10. The delivery method according to claim 7, wherein a wheel of the delivery vehicle is driven so as to cancel the predicted displacement when the operation of the delivery vehicle is controlled so as to counteract the predicted displacement.

11. The delivery method according to claim 7, wherein
a manipulator is provided in at least one of the transportation vehicle and the delivery vehicle, and
a displacement occurring in the manipulator due to the acceleration of the transportation vehicle is predicted based on the information about the acceleration, and an operation of the manipulator is controlled so that the predicted displacement is counteracted.

12. A delivery method for conveying an article to be delivered inside a transportation vehicle by using a manipulator comprising a base part, a link base part, a first link, a second link, and an end effector, the transportation vehicle being configured to transport the article, wherein
the delivery method makes a computer perform processes including:
acquiring information about an acceleration of the transportation vehicle from the transportation vehicle; and
predicting a displacement occurring in the manipulator due to the acceleration of the transportation vehicle based on the information about the acceleration;
when the predicted displacement is less than a first threshold, causing the first link and the second link to extend in a direction parallel to a floor surface of the transportation vehicle; and
when the predicted displacement is greater than or equal to the first threshold, causing the first link and the second link to be folded to align with each other and extend in a direction parallel with a rotation shaft of the link base part.

13. A non-transitory computer readable medium storing a program for putting an autonomously-moving-type delivery vehicle into a transportation vehicle and transport the delivery vehicle by the transportation vehicle, the delivery vehicle comprising three pairs of wheels and being configured to deliver an article, wherein
the program being adapted to cause a computer to perform processes including:
acquiring information about an acceleration of the transportation vehicle from the transportation vehicle;
predicting a displacement occurring in the delivery vehicle due to the acceleration of the transportation vehicle based on the information about the acceleration;
when the predicted displacement is less than a first threshold, causing the delivery vehicle to operate on two pairs of wheels; and
when the predicted displacement is greater than or equal to the first threshold, causing the delivery vehicle to operate on three pairs of wheels.

14. A non-transitory computer readable medium storing a program for conveying an article to be delivered inside a transportation vehicle by using a manipulator comprising a base part, a link base part, a first link, a second link, and an end effector, the transportation vehicle being configured to transport the article, wherein
the program being adapted to cause a computer to perform processes including:
acquiring information about an acceleration of the transportation vehicle from the transportation vehicle; and
predicting a displacement occurring in the manipulator due to the acceleration of the transportation vehicle based on the information about the acceleration;
when the predicted displacement is less than a first threshold, causing the first link and the second link to extend in a direction parallel to a floor surface of the transportation vehicle; and
when the predicted displacement is greater than or equal to the first threshold, causing the first link and the second link to be folded to align with each other and extend in a direction parallel with a rotation shaft of the link base part.

* * * * *